No. 789,825. PATENTED MAY 16, 1905.
J. A. WARNER.
APPLE CUTTING MACHINERY.
APPLICATION FILED APR. 21, 1904.

Witnesses:
Clarence W. Carroll
D. Gurnee.

Inventor:
John A. Warner
by Osgood & Davis
his attys

No. 789,825.

Patented May 16, 1905.

UNITED STATES PATENT OFFICE.

JOHN ALBRIGHT WARNER, OF ONTARIO, NEW YORK.

APPLE-CUTTING MACHINERY.

SPECIFICATION forming part of Letters Patent No. 789,825, dated May 16, 1905.

Application filed April 21, 1904. Serial No. 204,296.

*To all whom it may concern:*

Be it known that I, JOHN ALBRIGHT WARNER, a citizen of the United States, and a resident of Ontario, in the county of Wayne and State of New York, have invented certain new and useful Improvements in Apple-Cutting Machinery, of which the following is a specification.

This invention relates to apple-cutting machinery; and it consists in the mechanism hereinafter described and claimed.

Figure 1:
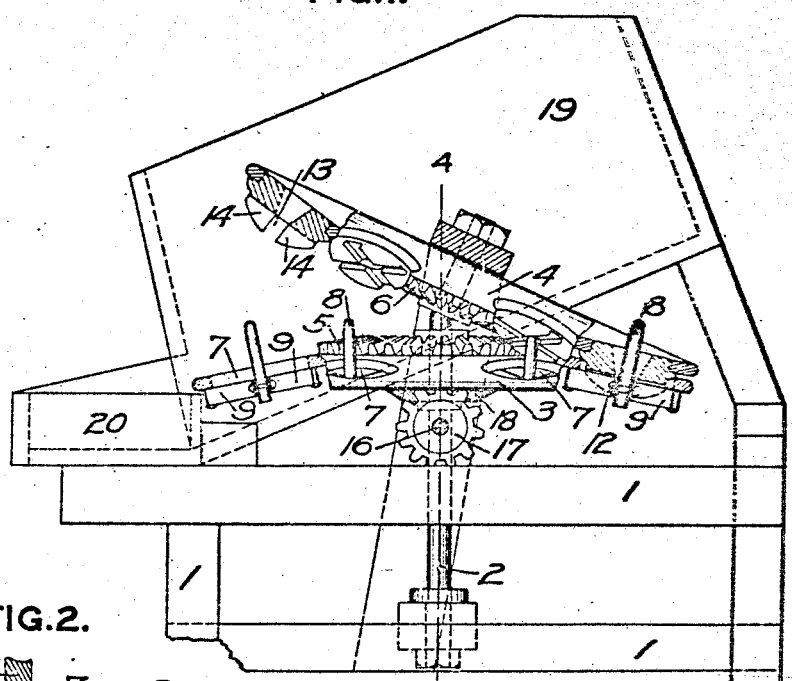
Figure 2:
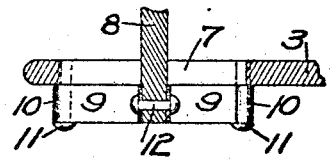
Figure 3:
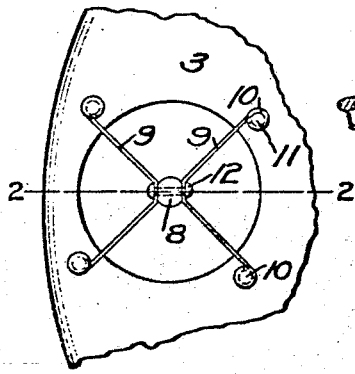
Figure 4:
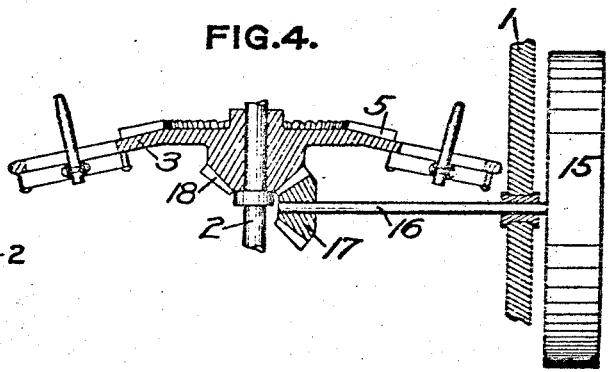

In the drawings, Figure 1 is a side elevation of an apparatus embodying this invention, portions being removed to show internal construction. Fig. 2 is an enlarged section through one of the knives on the line 2 2 of Fig. 3. Fig. 3 is a view from beneath of one of the knives and a part of the knife-support, and Fig. 4 is a partial section on the line 4 4 of Fig. 1.

This invention relates particularly to devices for cutting cored and peeled apples into several portions, such as quarters, to which division the present machine is adapted.

The frame 1 supports a shaft 2, that is vertical for a portion of its length and turns at a slight angle near its upper end. On the vertical portion is the rotary knife-support 3, and upon the angular portion of the shaft is the presser-support 4, so that the two supports when revolving together move to and from each other. The shaft 2 is supported in any suitable manner on the frame 1, so as to be stationary. The knife-support 3 and the presser-support 4 both revolve upon the shaft and are connected so as to rotate together—as, for instance, by the sets of gear-teeth 5 and 6. The edges of the knife-support 3 and of the presser-support 4 may be set at a slight angle to the plane of revolution of the support, and by this arrangement it will be seen that there is more room for handling the apples or fruit to be divided.

The knife-support 3 has around its edge a series of perforations or knife-openings 7, each large enough for the passage of a cored and peeled apple. To the under side of the knife-support and adjacent to the edges of the perforations 7 are fastened the knives and a guide-post 8. These knives and guide-post may be of any form and material suitable to guide and cut the apples by the action of the pressers; but it is preferred to make the knives as shown most plainly in Figs. 2 and 3. There are two knife members, each of which is made of a strip 9 of brass, having an eye or loop 10 made in its ends, through which bolts or screws 11 may pass to fasten the knife to the under side of the table. The two cutting portions of each knife member are set at right angles to each other, and at the middle or bends the two members are fastened to the guide-post 8 by a bolt or rivet 12 passing through both members and the guide-post and fastening the parts securely together. The guide-post is made, preferably, of wood. The knife-blades are set transversely to the path of movement of the knife-support.

The presser-support has upon it a series of perforations arranged in positions corresponding to the positions of the knives and knife-openings in the knife-support, so that the parts of one support will register with those of the other support as the two supports revolve together. The preferred form of these pressers is a series of wooden blocks inserted in perforations in the inclined edge of the presser-support. Each presser has a center hole 13, to fit upon and pass down along the guide-post 8, and transverse slots 14, adapted to fit over the knives 9 and to force the fruit past the knives.

The device may be driven in any suitable manner. A convenient mode of driving it is by the pulley 15 on the shaft 16, carrying the beveled gear 17, meshing with the beveled gear 18 upon the knife-support 3.

The operation of the device is as follows: The cored and peeled apples are placed in a hopper 19 and are drawn from it into a conveniently-placed trough or table 20, from which they are taken by hand and placed one by one upon the guide-posts 8 as they approach the operator. As the parts revolve it will be seen from Fig. 1 that an apple upon the guide-post will be met by the presser and will be forced through the opening 7, being quartered by the knives 9 and pushed through said knives by the presser, so that it may drop into a convenient receptacle arranged below the rear side of the machine.

It will be noted that in the embodiment of this invention shown in the drawings the knife-support and the presser move in the same direction circularly and to and from each other, and that the movement of the presser is also oblique with reference to the knife-support, and that, considering the knife-support and the presser as the two essential parts, the guide-post is on one of these parts and is in position to guide an apple thereon to the knife. The knife-support and the presser are each movable in a definite path as the bearings determine the paths.

What I claim is—

1. In an apple-cutting machine, a knife-support movable in a definite path, a knife on said support and a presser movable in a definite path oblique to said knife-support and to and from the same and adapted to register with the knife for forcing a fruit against said knife, and means for moving said knife-support and said presser simultaneously in the same direction.

2. In an apple-cutting machine, a knife-support as one part movable in a definite path, a knife on said support, a presser as another part movable in a definite path oblique to said knife-support and to and from the same and adapted to register with the knife for forcing a fruit against said knife, a guide-post on one of said parts in position to guide an apple thereon to the knife, and means for moving said knife-support and said presser simultaneously in the same direction.

3. In an apple-cutting machine, a knife-support movable in a definite path, a knife on said support, a presser movable in a definite path oblique to said knife-support and to and from the same and adapted to register with the knife for forcing a fruit against said knife, a guide-post on said knife-support in position to guide an apple thereon to the knife, and means for moving said knife-support and said presser simultaneously in the same direction.

4. In an apple-cutting machine, a revoluble knife-support having a series of sets of knives arranged around the edge thereof and a series of guide-posts for supporting a cored apple in position to be forced against each set of knives, a presser-support revoluble with said knife-support and at an angle thereto, and a series of pressers on said presser-support arranged to register with said guide-posts and knives for forcing an apple upon a post through its set of knives.

5. In an apple-cutting machine, a revoluble knife-support having a series of perforations near its edge, sets of knives arranged under said perforations, a series of guide-posts extending upward through said perforations in position to guide cored apples thereon to the set of knives, a presser-support revoluble with said knife-support and at an angle thereto, a series of pressers arranged to register with said guide-posts and knives for forcing an apple on a post through its set of knives.

6. In an apple-cutting machine, a revoluble knife-support having a series of sets of knives arranged around the center thereof, a presser-support revoluble with said knife-support and at an angle thereto, and a series of pressers on said presser-support arranged to register with said knives for forcing apples through the sets of knives.

JOHN ALBRIGHT WARNER.

Witnesses:
HATTIE J. PINTLER,
MYRON THOMPSON.